United States Patent
Wedig et al.

(10) Patent No.: US 11,380,943 B2
(45) Date of Patent: Jul. 5, 2022

(54) PREFAILURE MONITORING SYSTEM

(71) Applicant: OneEvent Technologies, Inc, Mount Horeb, WI (US)

(72) Inventors: Kurt Joseph Wedig, Mount Horeb, WI (US); Daniel Ralph Parent, Mount Horeb, WI (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 0 days.

(21) Appl. No.: 17/195,088

(22) Filed: Mar. 8, 2021

(65) Prior Publication Data
US 2021/0210804 A1 Jul. 8, 2021

Related U.S. Application Data

(63) Continuation of application No. 16/697,815, filed on Nov. 27, 2019, now Pat. No. 10,971,768, which is a continuation of application No. 15/728,629, filed on Oct. 10, 2017, now Pat. No. 10,497,991.

(60) Provisional application No. 62/406,590, filed on Oct. 11, 2016.

(51) Int. Cl.
| | |
|---|---|
| *H01M 10/48* | (2006.01) |
| *H02J 7/00* | (2006.01) |
| *H01M 10/44* | (2006.01) |
| *H01M 10/42* | (2006.01) |
| *H02J 9/06* | (2006.01) |

(52) U.S. Cl.
CPC ......... *H01M 10/482* (2013.01); *H01M 10/42* (2013.01); *H01M 10/44* (2013.01); *H02J 7/0047* (2013.01); *H02J 7/0068* (2013.01); *H02J 9/061* (2013.01); *H01M 10/4207* (2013.01); *H01M 10/441* (2013.01)

(58) Field of Classification Search
CPC .... H01M 10/482; H01M 10/42; H01M 10/44; H01M 10/4207
See application file for complete search history.

(56) References Cited

U.S. PATENT DOCUMENTS

| | | |
|---|---|---|
| 9,728,993 B2 * | 8/2017 | Butzmann ............. H02J 7/0031 |
| 2009/0206841 A1 | 8/2009 | Weng |
| 2013/0295419 A1 | 11/2013 | Kwon et al. |
| 2013/0323553 A1 | 12/2013 | Bergmann |
| 2017/0102435 A1 | 4/2017 | Hanking |

* cited by examiner

*Primary Examiner* — Stewart A Fraser
(74) *Attorney, Agent, or Firm* — Kenneth A. Smith (57) ABSTRACT

A system includes an energy storage system having a plurality of batteries and a monitoring system operably coupled to the energy storage system. The monitoring system is configured to receive a first measurement corresponding to a characteristic from at least one of the plurality of batteries, determine a baseline from the first measurement, receive a second measurement from the at least one of the plurality of batteries, and compare the second measurement with the baseline to identify an issue with the at least one of the plurality of batteries. The monitoring system is also configured to perform a remediation action in response to the identified issue.

20 Claims, 4 Drawing Sheets

PREFAILURE MONITORING SYSTEM

CROSS-REFERENCE TO RELATED APPLICATION

This application claims priority from U.S. patent application Ser. No. 16/697,815, filed on Nov. 27, 2019, which claims priority from U.S. patent application Ser. No. 15/728,629, filed on Oct. 10, 2017, now U.S. Pat. No. 10,497,991, which claims priority from U.S. Provisional Patent Application No. 62/406,590, filed on Oct. 11, 2016, the entirety of which are incorporated by reference herein.

BACKGROUND

The following description is provided to assist the understanding of the reader. None of the information provided or references cited is admitted to be prior art. Some systems, such as energy storage systems, include sensors for monitoring equipment (e.g., batteries). Such systems may include alarm levels if the conditions of the equipment are above (or below) an alarm level. For example, if lithium ion batteries are heated to a temperature of above about 135° Fahrenheit, the batteries may become dangerous.

SUMMARY

In accordance with some aspects of the present disclosure, a system is disclosed. The system includes an energy storage system having a plurality of batteries and a monitoring system operably coupled to the energy storage system. The monitoring system is configured to receive a first measurement corresponding to a characteristic from at least one of the plurality of batteries, determine a baseline from the first measurement, receive a second measurement from the at least one of the plurality of batteries, and compare the second measurement with the baseline to identify an issue with the at least one of the plurality of batteries. The monitoring system is also configured to perform a remediation action in response to the identified issue.

In accordance with some other aspects of the present disclosure, a method is disclosed. The method comprises receiving, by a monitoring system, a plurality of first measurements corresponding to a characteristic from each of a plurality of batteries, determining, by the monitoring system, a baseline from the plurality of first measurements for the characteristic for each of the plurality of batteries, and receiving, by the monitoring system, a second measurement corresponding to the characteristic from each of the plurality of batteries. The method also includes comparing, by the monitoring system, the second measurement with the baseline, identifying, by the monitoring system, an issue with one or more of the plurality of batteries based upon the comparison, and taking, by the monitoring system, a remediation action, to address the issue.

In accordance with yet other aspects of the present disclosure, a monitoring system is disclosed. The monitoring system includes a memory configured to store a plurality of baseline values and a processor operably connected to the memory. The processor is configured to receive a plurality of first measurement values corresponding to a characteristic from at least one of the plurality of batteries, determine a baseline value from the plurality of first measurement values, and store the baseline value in the memory. The processor is also configured to receive a second measurement value from the at least one of the plurality of batteries, compare the second measurement value with the baseline value to identify an issue with the at least one of the plurality of batteries, and in response to the identified issue, perform a remediation action.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some systems include sensors that monitor the status of various equipment. For example, a battery system may include temperature probes that monitor the temperature of the batteries. In another example, motors in an industrial factory may include vibration monitors to monitor the status of the motor. Such systems may include alarm levels that indicate that a problem exists. For example, it can be determined that if a battery temperature exceeds 150° Fahrenheit, the battery should stop being used because it has a malfunction. Various embodiments described herein monitor the status of the various equipment and determine whether the equipment deviates from its normal conditions. Further, the various embodiments described herein gather various types of information from the equipment being monitored to identify what constitutes a "normal condition" for that particular equipment. If the equipment does deviate from its normal conditions (e.g., the temperature of the battery rises from its normal temperature), various embodiments described herein predict that an issue exists and can notify appropriate personnel before the problem causes an accident or an unintentional shutdown. Notifications may be sent on a mobile device or another device associated with the personnel. Notifications may additionally or alternatively include visual, audible, or any other type of alarm that may be considered suitable.

Thus, in some embodiments, the present disclosure includes an energy storage system that has a plurality of batteries and a plurality of sensors configured to monitor a characteristic of the batteries. The system also includes a climate control system that includes a fan configured to circulate air around the energy storage system and a processor operatively coupled to the plurality of sensors and the climate control system. The processor is configured to receive, from the plurality of sensors, a plurality of baseline measurements of the characteristic for each of the batteries and determine, from the plurality of baseline measurements, a baseline characteristic for each of the batteries. The processor is also configured to receive, from the plurality of sensors, a plurality of current measurements of the characteristic for each of the batteries and determine, by comparing the plurality of current measurements to the baseline characteristic for each of the batteries, that the current measurements of a first battery have deviated from the baseline characteristic. The processor is further configured to cause, based on the determination that the current measurements of the first battery have deviated from the baseline characteristic, the climate control system to circulate air around the energy storage system.

Figure 1:
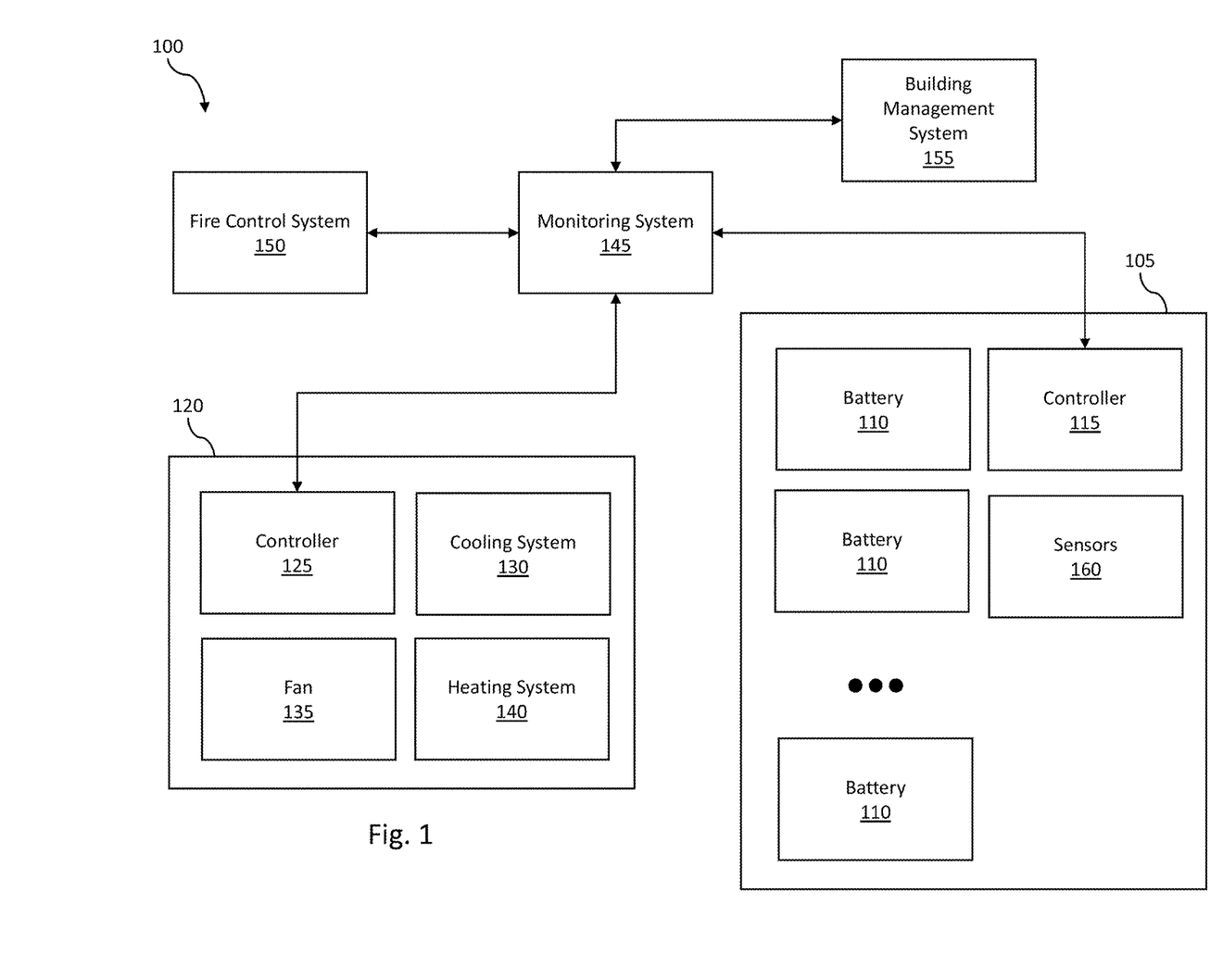
FIG. 1 is a block diagram of an energy storage system monitoring system in accordance with an illustrative embodiment.

FIG. 1 is a block diagram of an energy storage system monitoring system in accordance with an illustrative embodiment. FIG. 1 includes an energy storage system (ESS) 105, a climate control system 120, a monitoring system 145, a fire control system 150, and a building management system 155. The ESS 105 includes a plurality of batteries 110 and a controller 115. The climate control system 120 includes a controller 125, a cooling system 130, a fan 135, and a heating system 140. In alternative embodiments, additional, fewer, and/or different elements may be used. For example, although the ESS 105, the climate control system 120, the monitoring system 145, the fire control system 150, and the building management system 155 are shown as separate systems, in alternative embodiments, two or more of the systems can be combined.

The ESS 105 can be, for example, an uninterruptable power supply (UPS) that is a backup power system. In such an example, the ESS 105 stores energy from a power source, such as a power grid. In an illustrative embodiment, the power source is used to power equipment such as computers, motors, valves, sensors, lights, medical equipment, commercial equipment, industrial equipment, etc. The controller 115 can monitor the energy from the power source. If the power source fails to provide energy to the equipment (e.g., the voltage and/or the amperage of the power source drops below a threshold value), the controller 115 can cause one or more of the batteries 110 to discharge and supplement the power source. In such an example, the equipment powered by the power source is not affected by a lack of power even though the power source failed.

In an illustrative embodiment, although not shown, the ESS 105 includes a plurality of switches to selectively charge, discharge, or disconnect the plurality of batteries 110 from the power source. For example, to charge one or more of the plurality of batteries 110, the controller 115 can cause switches to electrically connect the plurality of batteries that are to be charged to the power source. In embodiments in which the power source is grid power or another alternating current (AC) power source, the ESS 105 can include a power rectifier and/or an inverter (e.g., an AC-to-direct current (DC) converter and/or a DC-to-AC converter). In another example, to discharge one or more of the plurality of batteries 110 (e.g., power the load), the controller 115 can cause the switches to electrically connect the plurality of batteries that are to be discharged to the load. In yet another example, if one or more of the plurality of batteries 110 are charged and the power source is suitably providing power to the load, the controller 115 can cause those plurality of batteries to be electrically disconnected from the power source and the load.

In an illustrative embodiment, the plurality of batteries 110 are lithium ion batteries. In alternative embodiments, one or more of the plurality of batteries 110 can be any other suitable type of battery such as lead acid (e.g., a valve regulated lead acid (VRLA) battery), carbon zinc-acidic manganese dioxide, and/or zinc alkaline manganese dioxide. In embodiments in which the plurality of batteries 110 are lithium ion batteries, each of the plurality of batteries can be button or coin cell batteries. In alternative embodiments, any suitable size of the plurality of batteries 110 can be used. Furthermore, the plurality of batteries 110 need not all be of the same type. Rather, various types of batteries, as discussed herein, can be provided within the ESS 105 to form the plurality of batteries 110.

Additionally, the plurality of batteries 110 can be arranged in any suitable manner. For example, multiple ones of the plurality of batteries 110 can be placed in series with one another to form a stack of batteries. The voltage across the stack of batteries is the sum of the voltages of the individual batteries in the stack. In some embodiments, the plurality of batteries 110 can be configured in a parallel manner such that the voltage across the plurality of batteries connected in parallel is the voltage of the individual batteries, but that the amperage capacity of the batteries is the sum of amperage capacity of the individual batteries connected in parallel. In some embodiments, multiple stacks of batteries can be formed from the plurality of batteries 110 and wired in parallel and/or series with one another. The number of the plurality of batteries 110 in each stack and the number of stacks used can be determined based on the load that ESS 105 is designed to power.

In an illustrative embodiment, the controller 115 is in communication with one or more sensors 160. For example, the ESS 105 can include a temperature sensor for each of the plurality of batteries 110 and/or each stack of the plurality of batteries. In another example, the ESS 105 can include a temperature sensor for each of the plurality of batteries 110 and/or each stack of the plurality of batteries. In an illustrative embodiment, the ESS 105 can include voltage sensors that sense the voltage of each of the plurality of batteries 110. In alternative embodiments, the ESS 105 includes voltage sensors that sense the voltage of each stack of the plurality of batteries 110. In an illustrative embodiment, the ESS 105 can include current sensors that sense the current of each of the plurality of batteries 110. In alternative embodiments, the ESS 105 includes current sensors that sense the current of each stack of the plurality of batteries 110. In yet other embodiments, other types of sensors can be provided based upon the condition that is to be monitored.

In some instances, the plurality of batteries 110 have operating conditions which, if exceeded, can reduce the performance of those batteries. For example, if lithium ion batteries exceed about 135° Fahrenheit (F), the batteries can outgas. Likewise, liquid within the lithium ion batteries can boil and build up pressure within the cell. The gas within the cell can be vented from the cell, thereby outgassing. In some instances, if the cells cannot vent the gas fast enough, the cells can burst or explode. For example, if the cells cannot vent the gas fast enough, the reaction within the cell can increase, resulting in thermal runaway. That is, as the temperature inside the cell increases, an exothermic reaction increases, thereby increasing the rate of the reaction. If the heat cannot escape to keep the cell cool (e.g., by venting), the reaction continues to increase until the battery fails (e.g., breaks, bursts, explodes, etc.).

The gasses vented by the plurality of batteries 110 can be harmful to humans. For example, the gasses from the outgassing of the plurality of batteries 110 can be toxic or explosive. In an illustrative embodiment, the temperature (or any other suitable characteristic) of the plurality of batteries 110 can be monitored to determine whether one or more of the plurality of batteries are (or may be) outgassing. In an illustrative embodiment, the system 100 includes one or more air monitors (e.g., that can be provided as part of or separate from the one or more sensors 160) that monitor for the chemicals released by the plurality of batteries 110 to determine that the plurality of batteries are outgassing and/or that dangerous conditions exist. The monitored gasses can include methane, ethane, hydrogen, oxygen, or any other toxic or explosive gas. Thus, the system 100 can be configured to monitor for air quality in the vicinity of the plurality of batteries 110.

As shown in FIG. 1, the system 100 can include a climate control system 120. The climate control system 120 can be used to control the atmosphere of a room in which the ESS 105 is in. For example, the ESS 105 can be located in a server room, a motor control center, a transformer room, etc. The climate control system 120 can control the temperature and the air flow through the room that the ESS 105 is housed in. For example, the fan 135 can recirculate air within the room or introduce fresh air into the room. The cooling system 130 can cool the air moved by the fan. Similarly, the heating system 140 can heat the air moved by the fan. Thus, the climate control system 120 can maintain the ambient temperature of the ESS 105 (and the batteries 110) at an ideal temperature for the operation of the ESS 105 (or any other suitable reason). For example, the monitoring system 145 may monitor the temperature of the plurality of batteries 110 and compare the monitored temperature with a baseline characteristic. The monitoring system 145 may keep monitoring the temperature of the plurality of batteries 110 and keep the cooling system 145 or the heating system 140 activated until the monitored temperature falls within a particular threshold.

In an illustrative embodiment, the temperature, voltage, current, or other sensors of the ESS 105 are provided by a manufacturer of the ESS 105. The controller 115 can monitor the status (e.g., temperature, voltage, current, etc.) of the plurality of batteries 110 and operate the appropriate switches to maintain the plurality of batteries within acceptable operating conditions. For example, if the temperature of a particular one of the plurality of batteries 110 is exceeding acceptable operating conditions during discharge of that particular battery, the controller 115 can electrically disconnect that battery from the load.

However, in some instances, the controller 115 is incapable of maintaining one or more of the plurality of the batteries 110 at acceptable operating conditions by connecting or disconnecting the batteries from the power source or the load. For example, during thermal runaway of a particular one of the plurality of batteries 110, the controller 115 may be unable to control the temperature of the particular battery. In such an example, the monitoring system 145 can be used to notify appropriate personnel and to mitigate the danger of the thermal runaway by, for example, sounding an alarm, venting the gas produced by the particular battery, cooling the particular battery (e.g., with a fire suppressant, foam, or other material), preventing access to the ESS 105, etc.

In an illustrative embodiment, the monitoring system 145 is in communication with the controller 115. For example, there may be an application program interface (API) between the monitoring system 145 and the controller 115. The API can allow the monitoring system 145 to monitor the one or more sensors 160 of the ESS 105. For example, the monitoring system 145 receives the temperature of each of the plurality of batteries 110 (or each stack of the plurality of batteries 110) from the controller 115. The monitoring system 145 can, thus, monitor the temperature of the plurality of batteries 110 to determine whether the plurality of batteries are within acceptable operating conditions, exceed acceptable operating conditions (e.g., begin to outgas), are dangerous (e.g., experiencing thermal runaway), or are not operating normally.

In an illustrative embodiment, if the monitoring system 145 determines that one or more of the plurality of batteries 110 are (or may be) outgassing (e.g., based on the temperature of the plurality of batteries), the monitoring system can operate the climate control system 120 to mitigate the dangers of the outgassing. For example, the monitoring system 145 can communicate with the controller 125 of the climate control system 120. In an illustrative embodiment, when the monitoring system 145 determines that one or more of the plurality of batteries 110 are outgassing, the monitoring system 145 transmits a command to the controller 125 to turn on the fan 135. For example, the fan 135 can introduce fresh air into the room of the ESS 105 to dissipate the gasses vented by the plurality of batteries 110. In an illustrative embodiment, the climate control system 120 includes an exhaust vent that is in a safe location (e.g., away from people, animals, etc.). In an illustrative embodiment, the climate control system 120 includes one or more filters (e.g., carbon filters) to filter out dangerous or any other suitable gasses from the air. In such an embodiment, the fan 135 can recirculate air within the room with the ESS 105, thereby filtering out the gasses vented by the plurality of batteries 110.

In an illustrative embodiment, when the monitoring system 145 determines that one or more of the plurality of batteries 110 are overheating (e.g., exceeding acceptable operating temperatures, the monitoring system 145 can cause the cooling system 130 to cool the ambient temperature of the room, thereby cooling the plurality of batteries. In an illustrative embodiment, when the monitoring system 145 determines that one or more of the plurality of batteries 110 are below acceptable operating temperatures, the monitoring system 145 can cause the heating system 140 to heat the ambient temperature of the room, thereby heating the plurality of batteries.

In an illustrative embodiment, the monitoring system 145 can monitor the status of the plurality of batteries 110 over time to determine whether one or more of the plurality of batteries are to be replaced or require maintenance. For example, the monitoring system 145 can receive voltage and amperage information for each of the plurality of batteries 110 (or stack of the plurality of batteries 110). The voltage and amperage information can be used to determine whether any of the plurality of batteries 110 or which of the plurality of batteries are over or under charged. The monitoring system 145 can determine whether one or more of the plurality of batteries 110 are exceeding the maximum acceptable amperage. Thus, the monitoring system 145 monitors one or more operating conditions of the plurality of batteries 110. To identify whether the plurality of batteries 110 are operating under normal conditions, the monitoring system 145 first establishes what constitutes normal conditions for each of the plurality of batteries.

Therefore, in an illustrative embodiment, the monitoring system 145 determines the baseline characteristic (also referred to herein as "baseline performance," "baseline value," or simply "baseline") of each of the plurality of batteries 110 (or stacks of the plurality of batteries). In an illustrative embodiment, the monitoring system 145 determines the baseline characteristic of each of the plurality of batteries 110 while charging (e.g., when disconnected from the load, but connected to the power source), while discharging (e.g., connected to the load), and while disconnected from both the load and the power source. Thus, for each of the plurality of batteries 110, the monitoring system 145 can establish multiple baseline characteristics, with each baseline characteristic corresponding to a particular event or mode of operation (e.g., charging, discharging, etc.). Furthermore, the baseline characteristic for each mode of operation can be based upon a particular characteristic of the plurality of batteries 110. The characteristics can be temperature, current, voltage, vented gas, or any other feature of the plurality of batteries 110 that are desired to be monitored. Thus, the monitoring system 145 monitors one or more characteristics of each of the plurality of batteries 110 during each mode of operation to establish one or more baseline characteristics. In other words, for each mode of operation and for each characteristic in that mode of operation, the monitoring system 145 determines one instance of the baseline characteristic.

For example, in some embodiments, during two or more charging cycles of a stack of the plurality of batteries 110, the monitoring system 145 can determine the average characteristics of the stack of the plurality of batteries. The average characteristics can be, for example, an average current, an average voltage, an average temperature, etc. The average characteristics can be used as the expected/baseline characteristic of the stack of the plurality of batteries 110 during charging. Based upon the established baseline characteristics, the monitoring system 145 can identify (e.g., predict) various issues that arise (or may arise) related to the plurality of batteries 110.

In an example embodiment, the monitoring system 145 can determine (e.g., based on information received from the controller 115) an expected amount of current (e.g., baseline characteristic) for a particular one of the plurality of batteries 110 and an actual amount of current for that particular battery. For example, during discharge of the particular one of the plurality of batteries 110, the monitoring system 145 can determine that the particular battery is expected to output one Ampere (Amp). The monitoring system 145 can also determine that the particular battery is actually outputting one quarter of an Amp. Based on the difference between the expected output (one Amp) and the actual output (one quarter Amp), the monitoring system 145 can determine that the particular battery is to be replaced and/or maintenance is to be performed. For example, if the difference between the actual output of the particular battery and the expected output of that battery is greater than a threshold value, the monitoring system 145 can determine that the particular battery is not operating properly. In one example, if the actual output of the particular battery is 80% of the expected output of that battery, the monitoring system 145 can determine that maintenance should be performed on that battery (e.g., the battery can be replaced). In alternative embodiments, any suitable threshold limit can be used. For example, the threshold limit can be 98%, 95%, 90%, 80%, 75%, 60%, 50%, 25%, etc. In an illustrative embodiment, the monitoring system 145 can additionally or alternatively take environmental conditions into consideration.

When the monitoring system 145 determines that one or more of the plurality of batteries 110 are to be replaced or maintained, the monitoring system 145 can transmit an indication of the determination. For example, the monitoring system 145 can include a display such as a video monitor. In another example, the monitoring system 145 can transmit the determination to a human-machine interface (HMI). In another example, the monitoring system 145 can transmit such a determination to users via short message service (SMS) text messages or email. The monitoring system 145 can, thus, send notifications on a mobile device associated with a user (e.g., maintenance personnel), issue audible, visual, or tactile alarms, or send alerts in any other way that is considered desirable.

In an illustrative embodiment, the monitoring system 145 is in communication with the fire control system 150. The fire control system 150 can include one or more fire monitors (e.g., smoke detectors, smoke monitors, carbon monoxide (CO) monitors, thermal imaging, etc.) that monitor the room with the ESS 105 for a fire. In an illustrative embodiment, the fire control system 150 includes one or more fire monitors outside of the room that the ESS 105 is in. For example, the fire control system 150 can monitor for fires in adjacent rooms, nearby rooms, nearby buildings, nearby areas, etc. In an illustrative embodiment, if the monitoring system 145 determines that there is a fire in and/or near the ESS 105 (e.g., by receiving such an indication from the fire control system 150), the monitoring system 145 can cause the ESS to discharge the plurality of batteries 110. For example, the plurality of batteries 110 can be discharged in a safe manner. In an illustrative embodiment, the plurality of batteries 110 can store their energy in a remotely located capacitor. In alternative embodiments, any other suitable method of discharging the plurality of batteries 110 can be used. In such embodiments, the monitoring system 145 can cause the controller 115 to discharge the plurality of batteries 110 before the fire control system 150 causes a fire suppression system to be applied to the area with the ESS 105 (e.g., water sprinklers in the room of the ESS 105). By discharging the plurality of batteries 110 before the fire suppression system is applied, accidental discharge of those batteries (e.g., short circuiting the batteries 110 by water or foam) is avoided. In an illustrative embodiment, the plurality of batteries 110 can be discharged before emergency personnel receive, thereby reducing or eliminating the risk of an arc flash for emergency personnel caused by those batteries.

In an illustrative embodiment, the monitoring system 145 is in communication with the building management system 155. In an illustrative embodiment, the building management system 155 includes occupancy sensors that determine the occupancy of various rooms or locations. For example, the building management system 155 can determine the location of people in and around the room with the ESS 105. In an illustrative embodiment, when the monitoring system 145 determines that one or more of the plurality of batteries 110 have become dangerous (e.g., may be outgassing and/or may explode), the monitoring system can communicate to personnel the occupancy around the ESS 105. For example, the monitoring system 145 can communicate to emergency personnel (e.g., via phones or computers of the emergency personnel, by raising alerts and alarms, etc.) the location of people in the room (or in nearby rooms) with the ESS 105. Thus, the monitoring system 145 can establish baseline characteristics for the plurality of batteries 110, monitor those batteries, and issue alerts when one or more of the plurality of batteries deviate from their baseline characteristics.

Figure 2:
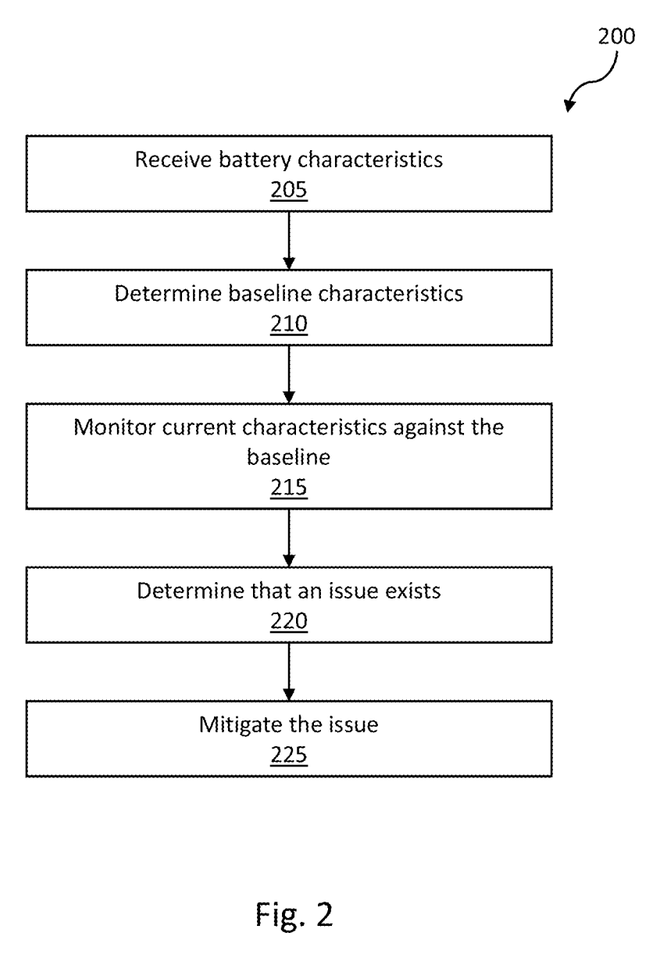
FIG. 2 is a flow chart of a method for monitoring an energy storage system in accordance with an illustrative embodiment.

FIG. 2 is a flow chart of a method for monitoring an energy storage system in accordance with an illustrative embodiment. In alternative embodiments, additional, fewer, and/or different operations may be performed. Also, the use of a flow chart and arrows is not meant to be limiting with respect to the order of operations or flow of information. For example, in some embodiments, two or more operations may be performed simultaneously.

In an operation 205, battery characteristics (e.g., measurement values) are received. For example, the monitoring system 145 receives an indication of the temperature, voltage, current, and any other characteristic desired to be monitored of the plurality of batteries 110 from the controller 115 of the ESS 105. In an illustrative embodiment, the characteristics of the plurality of batteries 110 are received over time. In some embodiments, the monitoring system 145 can continuously monitor the plurality of batteries 110 for the characteristics. In other embodiments, the monitoring system 145 can periodically monitor the plurality of batteries 110. As an example, during charging of one or more of the plurality of batteries 110, the monitoring system 145 can continuously or periodically monitor one or more characteristics (e.g., current, temperature, etc.) of the one or more plurality of batteries being charged. The monitoring system 145 can store the monitored characteristics in a database (e.g., with a timestamp indicating the time corresponding to the respective battery characteristic).

In an operation 210, baseline characteristics are determined. For example, baseline characteristics are determined based on the monitored characteristics received in the operation 205. In an illustrative embodiment, baseline characteristics can be determined based on the mode of the ESS 105. For example, baseline characteristics can be determined for the plurality of batteries 110 in a charging mode, in a discharging mode, and in disconnected mode. For example, for each of the plurality of batteries 110 (or stack of plurality of batteries), a baseline voltage, current, and temperature are determined for each of the charging mode, the discharging mode, and the disconnected mode.

Furthermore and as noted above, the monitoring system 145 can monitor the characteristics over various cycles (e.g., various charging cycles). Thus, as the monitoring system 145 accumulates more data pertaining to the monitored characteristics, the baseline characteristics can change. In some embodiments, the monitoring system 145 can take an average of the data pertaining to the monitored characteristics to obtain the baseline characteristics. In other embodiments, the monitoring system 145 can use other functions (e.g., assign weights, etc.) to determine the baseline characteristics.

Additionally, in some embodiments, the monitoring system 145 can be configured to establish the baseline characteristics for a particular battery (e.g., the plurality of batteries 110) when that particular battery is first installed. As an example, when the particular battery is first installed, the monitoring system 145 can be configured to monitor a pre-determined number of charging (and/or other events) cycles of that particular battery to establish the baseline characteristics. In other embodiments, the monitoring system 145 can additionally be configured to update the established baseline characteristics occasionally during the lifetime of the particular battery. For example, the monitoring system 145 can update the established baseline characteristics after every predetermined number of charging cycles, after a predetermined period of time (e.g., every given number of seconds, minutes, hours, days, weeks, months, etc.), or another established criteria.

In an operation 215, current characteristics are monitored against the baseline characteristics. In an illustrative embodiment, the monitoring system 145 continuously receives updated characteristics for each of the plurality of batteries 110. For example, the monitoring system 145 receives current characteristics once per millisecond, once per second, once per minute, once per hour, etc. The monitoring system 145 can determine whether the current characteristics are different from the established baseline characteristics for the appropriate mode. For example, if a particular battery of the plurality of batteries 110 is charging, the received current temperature of the particular battery is compared to the established baseline charging temperature for the particular battery.

In some embodiments, the monitoring system 145 is configured to update the baseline characteristics simultaneously with monitoring the current characteristics against already established baseline characteristics (e.g., the baseline characteristics before the update). In other words, the operation 210 and the operation 215 can be performed simultaneously.

In an operation 220, it is determined that an issue exists. For example, the current characteristics for a particular battery of the plurality of batteries 110 can begin to drift from the baseline characteristics. In one example, the monitoring system 145 has established that the baseline temperature of the particular battery of the plurality of batteries 110 during charging is 105° F. The monitoring system 145 continuously monitors the temperature of the particular battery of the plurality of batteries 110 and determines that the temperature of the particular battery rises over time from 105° F. to 120° F. Although the temperature of the particular battery does not rise to the level of being dangerous or malfunctioning (e.g., >135° F.), the monitoring system 145 can determine that the particular battery requires maintenance or replacement because the particular battery has deviated from its normal operating conditions (e.g., the established baseline characteristics relating to temperature during charging).

In an operation 225, the issue identified at the operation 220 is mitigated. The monitoring system 145 can determine which actions to take depending upon the issue identified at the operation 220 and the seriousness of the issue. For example, if the monitoring system 145 determines that there is a fire near the ESS 105, the monitoring system 145 can cause the plurality of batteries 110 to be discharged. In another example, if the monitoring system 145 determines that a particular battery of the plurality of batteries 110 is outgassing, the monitoring system 145 can cause the fan 135 to circulate the air around the ESS 105 to remove the dangerous gas. In another example, the monitoring system 145 can identify to appropriate personnel which of the plurality of batteries 110 has an issue, what the issue is, and a suggested action (e.g., maintenance, replacement of one or more of the plurality of batteries, etc.).

Further, as part of issue mitigation, the monitoring system 145 can raise various alerts. In some embodiments, the monitoring system 145 can send notifications to a user's mobile device, computer, or other computing or smart device. The monitoring system 145 can additionally or alternatively issue audible, tactile, and/or visual alarms. In some embodiments, the monitoring system 145 can also log the detected issues in a log for future reference.

Figure 3:
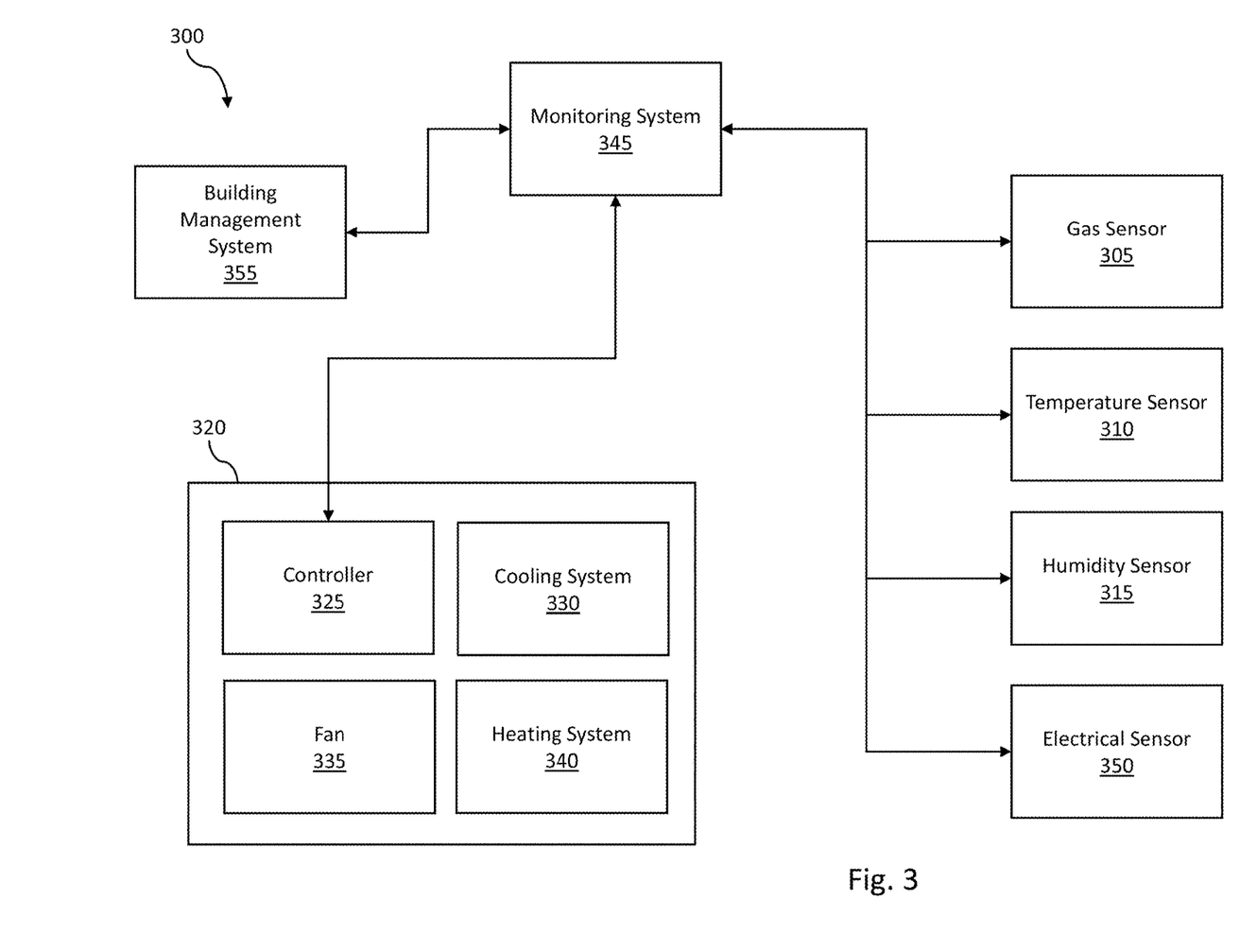
FIG. 3 is a block diagram of a livestock monitoring system in accordance with an illustrative embodiment.

FIG. 3 is a block diagram of a livestock monitoring system 300 in accordance with an illustrative embodiment. The livestock monitoring system 300 includes a gas sensor 305, a temperature sensor 310, a humidity sensor 315, an electrical sensor 350, a climate control system 320, a monitoring system 345, and a building management system 355. In alternative embodiments, additional, fewer, and/or different elements may be used.

In an illustrative embodiment, the livestock monitoring system 300 can be used to monitor and control the conditions of a livestock house (e.g., a barn, not shown). For example, hundreds or thousands of animals can be housed or penned within a building. Any suitable type of animal may be housed, such as chickens, pigs, goats, emus, llamas, cows, camels, etc. In an illustrative embodiment, the monitoring system 345 can be used to monitor the status and health of the animals.

In an illustrative embodiment, the gas sensor 305 can be used to monitor one or more gasses within or outside of the livestock house. For example, the gas sensor 305 can monitor for gasses that are harmful to the animals. If the gas sensor 305 detects a threshold level of dangerous gas, the monitoring system 345 can alert the appropriate personnel (e.g., via a text alert to a phone or a computer, via lights, via sounds, etc.). In an illustrative embodiment, the animals may emit gasses at different times during their maturation. The gasses emitted from the animals can be sensed by the gas sensor 305. Based on the gasses detected by the gas sensor 305, the monitoring system 345 can determine the maturation state of the animals. In an illustrative embodiment, the animals may emit gasses that are indicative of illness, disease, sickness, etc. In such an embodiment, the gas sensor 305 can monitor the air within the livestock house for such gasses and therefore, detect or predict sickness or disease amongst the animals. For example, based on the detection or level of such gasses, the monitoring system 345 can determine that the animals are sick or are becoming sick.

In an illustrative embodiment, the gas sensor 305 can monitor the livestock house over time and the monitoring system 345 can use the information from the gas sensor 305 to determine a baseline level of one or more gasses within the livestock house. For example, the gasses within the livestock house may vary during the day. In such an embodiment, the monitoring system 345 can determine a baseline level of the gasses throughout the day. The monitoring system 345 can continue to monitor the gasses within the livestock house to determine whether the gasses within the livestock house vary from the baseline amount. For example, if the gasses deviate from the baseline amount at a particular time of day greater than a threshold amount, then the monitoring system 345 can determine that an issue exists (e.g., illness, sickness, disease, etc.). In such an example, the type of gas and the deviation from the baseline (e.g., the amount of deviation, whether the deviation is greater than or less than the baseline, etc.) can be used by the monitoring system 345 to determine the type of illness, sickness, and/or disease within the livestock population. For example, the deviation from the baseline can be compared to a database of deviations corresponding to known illnesses, sicknesses, diseases, etc.

In an illustrative embodiment, the temperature sensor 310 can be used to monitor the temperature at one or more points in or around the livestock house. The monitoring system 345 can receive measurements from the temperature sensor 310 to determine a baseline temperature in and around the livestock house throughout a day, month, year, etc. The monitoring system 345 can continue to receive measurements and compare them to the baseline. If a current temperature deviates from the baseline by a threshold amount, the monitoring system 345 can determine that an issue exists. In an illustrative embodiment, the monitoring system 345 can monitor the difference between an inside temperature and an outside temperature.

In an illustrative embodiment, the humidity sensor 315 can be used to monitor the humidity at one or more points in or around the livestock house. The monitoring system 345 can receive measurements from the humidity sensor 315 to determine a baseline humidity in and around the livestock house throughout a day, month, year, etc. The monitoring system 345 can continue to receive measurements and compare them to the baseline. If a current humidity deviates from the baseline by a threshold amount, the monitoring system 345 can determine that an issue exists.

In an illustrative embodiment, the electrical sensor 350 can monitor the power consumed by one or more devices. For example, the electrical sensor 350 can include one or more ammeters, voltmeters, frequency sensors, etc. In an illustrative embodiment, the electrical sensor 350 can be used to monitor the power consumption of fans, lights, motors, etc. In such an embodiment, the monitoring system 345 can determine a baseline power consumption of the various devices being monitored. If the power consumption of the one or more devices deviates from the baseline amount, the monitoring system 345 can determine that an issue exists. Monitoring the various electrical components in a livestock house can help predict the failure of the devices, thereby avoiding failures that can risk the lives of the animals. For example, a fan can be used to circulate fresh air into the livestock house. If the amperage of the fan begins to increase compared to a baseline amount, then the monitoring system 345 can determine that the fan may have an issue. The monitoring system 345 can notify appropriate personnel before the fan fails that the fan should be checked or replaced. The maintenance of the fan can be scheduled for a time when the fan can be shutdown with no or minimal effect on the livestock.

In an illustrative embodiment, the monitoring system 345 monitors the status of the various conditions (e.g., temperature, humidity, gas, etc.) against a baseline level. When the current condition value begins to deviate from the baseline, the monitoring system 345 can determine that an issue exists or will exist. For example, the monitoring system 345 can determine that a piece of equipment will fail (or is beginning to fail), that the livestock are beginning to get sick or an illness is beginning to spread, etc.

In an illustrative embodiment, the monitoring system 345 can monitor conditions and react to predictions. For example, if the monitoring system 345 determines that a first fan is about to fail, the monitoring system 345 can cause a second fan to be used in place of the first fan. In another example, the monitoring system 345 can receive weather predictions and operate the climate control system 320 to prepare for the predictions. For example, if a received weather prediction indicates a sudden cold snap, the monitoring system 345 can prepare the climate control system 320 to heat the livestock house even if the current temperature is warm.

In an illustrative embodiment, multiple livestock houses can include an instance of the livestock monitoring system 300. In such an embodiment, the multiple instances of the monitoring system 345 can communicate with one another to predict conditions in other livestock houses. For example, if a first instance of the monitoring system 345 of a first livestock house determines that the livestock are sick, the first instance of the monitoring system can transmit the determination to the other instances of the monitoring system 345. The other instances of the monitoring system 345 can change operations of their respective livestock houses to prevent the spreading of the sickness. For example, the airflow through the livestock houses can be changed such that air from the first livestock house is not blown into the other livestock houses, thereby preventing or reducing the spread of disease. In another example, the temperature of the other livestock houses can be altered to decrease the chance of spreading disease (e.g., by heating or cooling the livestock house).

One aspect of some of the embodiments of the systems of FIGS. 1 and 3 is a monitoring system that determines a baseline characteristic, and monitors the characteristic to determine whether the characteristic is deviating from the baseline. If the characteristic does deviate from the baseline, the monitoring system can determine that an issue exists even though the deviation is not large enough to set off an alarm. In alternative embodiments, such a system can be adapted to be used in any suitable system. That is, such a system is not limited to an ESS or a livestock house.

In an illustrative embodiment, a monitoring system can be used in an industrial setting. For example, the monitoring system can determine a baseline level of various characteristics such as flow through a pipe, temperature of a process material, amperage of a motor, horsepower of a motor, voltage of a motor, vibration of a motor, or any other suitable characteristic. The monitoring system can monitor the characteristics and determine which, if any, deviate from their baseline level. If one or more of the characteristics begin to drift from the baseline level, then the monitoring system can take appropriate action, such as shutting down the process or device, notifying maintenance personnel, etc.

Figure 4:
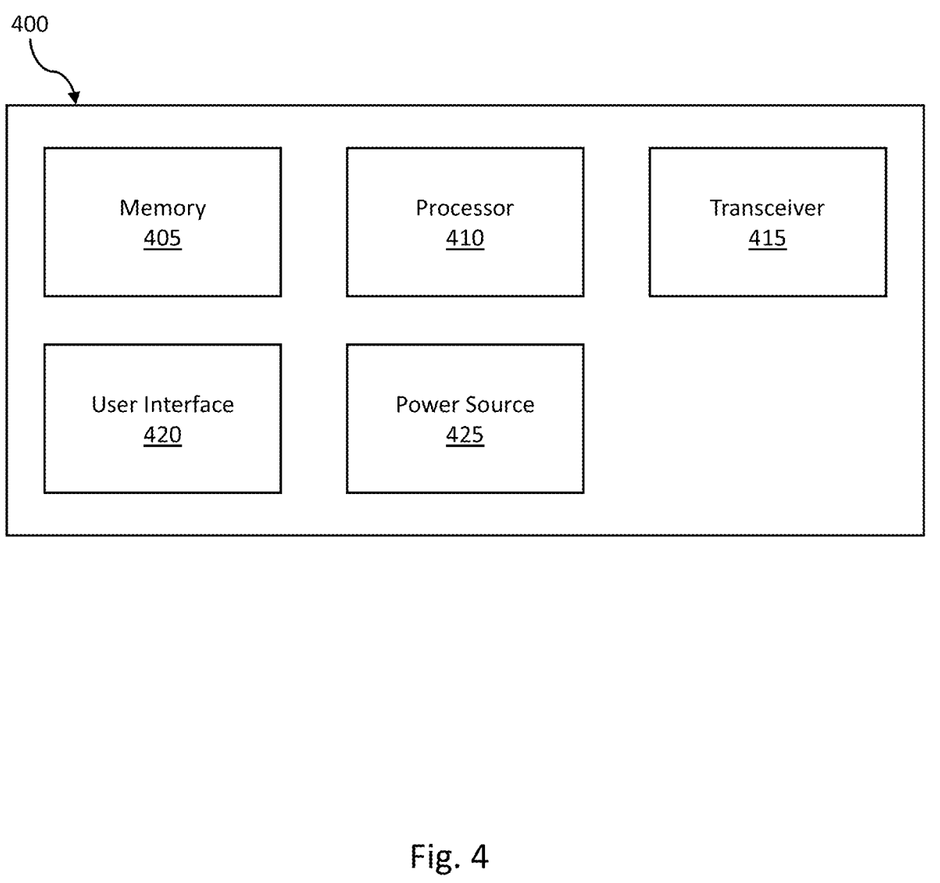
FIG. 4 is a block diagram of a computing device in accordance with an illustrative embodiment.

FIG. 4 is a block diagram of a computing device 400 in accordance with an illustrative embodiment. The computing device 400 includes a memory 405, a processor 410, a transceiver 415, a user interface 420, and a power source 425. In alternative embodiments, additional, fewer, and/or different elements may be used. The computing device 400 can be any suitable device described herein. For example, the computing device 400 can be a desktop computer, a laptop computer, a smartphone, a specialized computing device, etc. The computing device 400 can be used to implement one or more of the methods described herein.

In an illustrative embodiment, the memory 405 is an electronic holding place or storage for information so that the information can be accessed by the processor 410. The memory 405 can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. The computing device 400 may have one or more computer-readable media that use the same or a different memory media technology. The computing device 400 may have one or more drives that support the loading of a memory medium such as a CD, a DVD, a flash memory card, etc.

In an illustrative embodiment, the processor 410 executes instructions. The instructions may be carried out by a special purpose computer, logic circuits, or hardware circuits. The processor 410 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 410 executes an instruction, meaning that it performs the operations called for by that instruction. The processor 410 operably couples with the user interface 420, the transceiver 415, the memory 405, etc. to receive, to send, and to process information and to control the operations of the computing device 400. The processor 410 may retrieve a set of instructions from a permanent memory device such as a ROM device and copy the instructions in an executable form to a temporary memory device that is generally some form of RAM. The computing device 400 may include a plurality of processors that use the same or a different processing technology. In an illustrative embodiment, the instructions may be stored in memory 405.

In an illustrative embodiment, the transceiver 415 is configured to receive and/or transmit information. In some embodiments, the transceiver 415 communicates information via a wired connection, such as an Ethernet connection, one or more twisted pair wires, coaxial cables, fiber optic cables, etc. In some embodiments, the transceiver 415 communicates information via a wireless connection using microwaves, infrared waves, radio waves, spread spectrum technologies, satellites, etc. The transceiver 415 can be configured to communicate with another device using cellular networks, local area networks, wide area networks, the Internet, etc. In some embodiments, one or more of the elements of the computing device 400 communicate via wired or wireless communications. In some embodiments, the transceiver 415 provides an interface for presenting information from the computing device 400 to external systems, users, or memory. For example, the transceiver 415 may include an interface to a display, a printer, a speaker, etc. In an illustrative embodiment, the transceiver 415 may also include alarm/indicator lights, a network interface, a disk drive, a computer memory device, etc. In an illustrative embodiment, the transceiver 415 can receive information from external systems, users, memory, etc.

In an illustrative embodiment, the user interface 420 is configured to receive and/or provide information from/to a user. The user interface 420 can be any suitable user interface. The user interface 420 can be an interface for receiving user input and/or machine instructions for entry into the computing device 400. The user interface 420 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the computing device 400. The user interface 420 can be used to navigate menus, adjust options, adjust settings, adjust display, etc.

The user interface 420 can be configured to provide an interface for presenting information from the computing device 400 to external systems, users, memory, etc. For example, the user interface 420 can include an interface for a display, a printer, a speaker, alarm/indicator lights, a network interface, a disk drive, a computer memory device, etc. The user interface 420 can include a color display, a cathode-ray tube (CRT), a liquid crystal display (LCD), a plasma display, an organic light-emitting diode (OLED) display, etc.

In an illustrative embodiment, the power source 425 is configured to provide electrical power to one or more elements of the computing device 400. In some embodiments, the power source 425 includes an alternating power source, such as available line voltage (e.g., 120 Volts alternating current at 60 Hertz in the United States). The power source 425 can include one or more transformers, rectifiers, etc. to convert electrical power into power useable by the one or more elements of the computing device 400, such as 1.5 Volts, 8 Volts, 12 Volts, 24 Volts, etc. The power source 425 can include one or more batteries.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An energy storage system comprising:
    a first subsystem comprising a plurality of energy storage devices;
    a second subsystem comprising a plurality of environmental condition sensors; and
    a monitoring system operably coupled to the first subsystem and the second subsystem and programmed to perform the following steps:
    determine an energy flow status of the first subsystem;
    receive a first plurality of measurements from the second subsystem during a first period of time when the energy flow status of the first subsystem corresponds to a first status condition;
    calculate a baseline value for an environmental condition using the first plurality of measurements;
    at a second period of time, receive a second plurality of measurements from the second subsystem when the energy flow status condition is the same as that determined at the first period of time;
    using the second plurality of measurements, identify a future critical condition by determining that the second plurality of measurements indicate a trend which will extend outside of a predetermined range from the baseline; and perform a remediation action that is dependent upon the energy flow status.

2. The system of claim 1, wherein the second subsystem comprises temperature sensors for each of the plurality of energy storage devices and the future critical condition is a temperature value outside of a predetermined range.

3. The system of claim 2, wherein the remediation action comprises ventilation of the first subsystem.

4. The system of claim 2, wherein the remediation action comprises activation of a climate control system.

5. The system of claim 2, wherein the remediation action comprises disconnecting at least one of the energy storage devices from the first subsystem.

6. The system of claim 1 wherein the remediation action comprises limiting one of a charging current or a discharging current.

7. The system of claim 1, wherein the environmental condition sensors comprise at least one gas sensor.

8. The system of claim 7, wherein the remediation action comprises ventilation of the first subsystem.

9. The system of claim 7, wherein the remediation action comprises disconnecting at least one of the energy storage devices from the first subsystem.

10. The system of claim 1, wherein the energy flow status is a flow of energy into the first subsystem.

11. The system of claim 1, wherein the energy flow status is a flow of energy out of the first subsystem.

12. A method of managing an energy storage system comprising:

determining an energy flow status of a subsystem comprising a plurality of energy storage devices;

receiving a first plurality of environmental condition measurements during a first period of time when the energy flow status of the subsystem corresponds to a status condition selected from a flow of energy into the subsystem or a flow of energy out of the subsystem;

calculating a baseline value for an environmental condition using the first plurality of measurements;

receiving a second plurality of environmental condition measurements during a second period of time when the energy flow status condition is the same as that determined at the first period of time;

identifying a future critical condition by determining that the second plurality of measurements indicate a trend which will extend outside of a predetermined range from the baseline; and performing a remediation action that is dependent upon the energy flow status.

13. The method of claim 12, wherein the received plurality of environmental conditions are temperatures and the future critical condition is a temperature measurement outside of a predetermined range.

14. The method of claim 13, wherein the remediation action comprises activation of a climate control system.

15. The method of claim 12, wherein the remediation action comprises disconnecting at least one of the energy storage devices from the subsystem.

16. The method of claim 12, wherein the remediation action comprises limiting one of a charging current or a discharging current.

17. The method of claim 12, wherein the environmental condition sensors comprise at least one gas sensor.

18. The method of claim 17, wherein the remediation action comprises ventilation of the subsystem.

19. A system comprising:

a first subsystem comprising a plurality of energy storage components;

a second subsystem comprising a plurality of environmental condition sensors;

a discharge subsystem operably coupled to and configured to remove energy from the energy storage components of the first subsystem; and a monitoring system operably coupled to the first subsystem, the second subsystem, and the discharge subsystem, and programmed to perform the following steps:

receive environmental data from the second subsystem representing sensed environmental conditions;

analyze the environmental data to detect a hazardous environmental condition; and if a hazardous environmental condition is detected, cause the discharge subsystem to remove energy from the energy storage components of the first subsystem.

20. The system of claim 19, wherein the second subsystem is configured to conditions indicative of combustion.

* * * * *